US010248772B2

(12) United States Patent
Proulx et al.

(10) Patent No.: US 10,248,772 B2
(45) Date of Patent: Apr. 2, 2019

(54) SECURE COMMUNICATION BETWEEN A VIRTUAL SMARTCARD ENCLAVE AND A TRUSTED I/O ENCLAVE (71) Applicant: McAfee, Inc., Santa Clara, CA (US)

(72) Inventors: Francois Proulx, Montreal (CA); Mathieu Rene, Montreal (CA)

(73) Assignee: McAfee, LLC, Santa Clara, CA (US)

(*) Notice: Subject to any disclaimer, the term of this patent is extended or adjusted under 35 U.S.C. 154(b) by 0 days.

(21) Appl. No.: 14/866,545

(22) Filed: Sep. 25, 2015

(65) Prior Publication Data
US 2017/0091434 A1 Mar. 30, 2017

(51) Int. Cl.
G06F 21/32 (2013.01)

(52) U.S. Cl.
CPC .................................. G06F 21/32 (2013.01)

(58) Field of Classification Search
CPC ....................................................... G06F 21/32
See application file for complete search history.

(56) References Cited

U.S. PATENT DOCUMENTS

| | | | | |
|---|---|---|---|---|
| 5,131,038 | A * | 7/1992 | Puhl | G06F 21/35 235/380 |
| 8,984,622 | B1 * | 3/2015 | Baldwin | G06F 21/32 726/16 |
| 9,015,490 | B2 * | 4/2015 | Thom | G06F 21/31 713/182 |
| 2004/0236954 | A1 | 11/2004 | Vogt et al. | |
| 2005/0125537 | A1 * | 6/2005 | Martins | G06F 9/5083 709/226 |
| 2013/0013928 | A1 * | 1/2013 | Thom | G06F 21/31 713/182 |
| 2013/0232344 | A1 | 9/2013 | Johnson et al. | |
| 2014/0007087 | A1 | 1/2014 | Scott-Nash et al. | |
| 2014/0282945 | A1 | 9/2014 | Smith et al. | |

FOREIGN PATENT DOCUMENTS

WO 20130134832 9/2013

OTHER PUBLICATIONS

Apple Inc., "iOS Security," Apr. 2015, 55 pages.
Allyson Kazmucha, "Touch ID takes hardware security to new levels—Here's how, why, and what it means!," Oct. 31, 2013, iMore, 23 pages.
International Bureau, "International Preliminary Report of Patentability" issued in connection to International application No. PCT/US2016/053137, dated Apr. 5, 2018, 10 pages.
International Searching Authority, "Search Report and the Written Opinion", issued in connection with International application No. PCT/US2016/053137, dated Dec. 29, 2016, 11 pages.

* cited by examiner

Primary Examiner — Joseph P Hirl
Assistant Examiner — Hassan Saadoun
(74) Attorney, Agent, or Firm — Hanley, Flight & Zimmerman, LLC (57) ABSTRACT A system for accessing a trusted execution environment includes instructions to transmit, from a first trusted execution environment, a request for a biometric match claim, receive, in response to the request for a biometric match claim, biometric data from a biometric capture device, perform a match of the biometric data against biometric templates stored in the first trusted execution environment, and unseal a second trusted execution environment based on the match data.

18 Claims, 5 Drawing Sheets

SECURE COMMUNICATION BETWEEN A VIRTUAL SMARTCARD ENCLAVE AND A TRUSTED I/O ENCLAVE

TECHNICAL FIELD

Embodiments described herein generally relate to trusted enclaves, and more particularly to generating a secure communication between a virtual smartcard and a trusted I/O enclave.

BACKGROUND ART

Device security has become of utmost importance. For example, users want to protect sensitive data from unauthorized access or modification. In some instances, data security may achieved through means such as password protection or encryption. In some instances, biometric data may be used to further secure data. Biometric data may provide a more reliable determination that a user is an authorized user.

One issue that arises with biometric data is determining whether the data presented to the biometric reader is authentic, or whether it is an imitation. For example, an intruder may present a video of a legitimate user of a device in front of the device's camera to trick the device into falsely identifying the image of the person as the actual person.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "trusted device" or "trusted network device" may refer to a network device that is capable of trusted operations. A trusted device may view certain available services hosted by other trusted devices in a trusted network, whereas devices in a network that are not trusted network devices are prevented from accessing the services.

In one or more embodiments, biometric verification may be performed locally without server interaction, while user data remains secure on the local device. A user may be authenticated through the use of a credential manager application. The application requests a biometric match from a trusted execution environment. The trusted execution environment interfaces with a biometric capture device to obtain biometric data. When the trusted execution environment receives the biometric data, the biometric match module performs a match against local templates in the biometric match trusted execution environment. Then the match data is sent to a virtual smartcard trusted execution environment. The virtual smartcard trusted execution environment may verify the biometric match trusted execution environment, and unseal itself based on the match.

Figure 1:
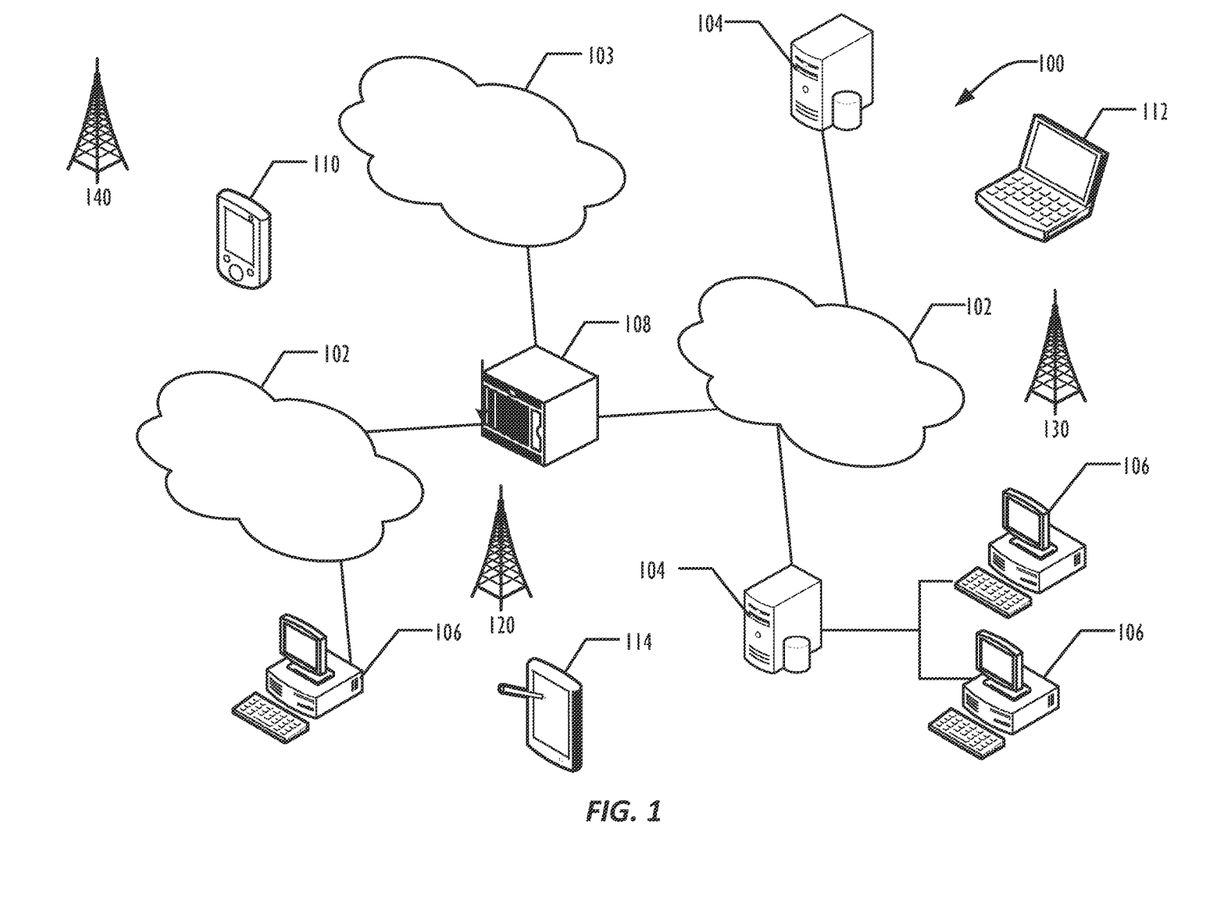
FIG. 1 is a diagram illustrating a network of programmable devices according to one or more embodiments.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Each of the networks 102 may contain a number of other devices typically referred to as Internet of Things (microcontrollers, embedded systems, industrial control computing modules, etc.). Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, most commonly is implemented in a firewall or intrusion protection system in a gateway or router. In one or more embodiments, one or more of the devices connected across network 102 may support trusted operations through the employment of a trusted execution environment (TEE).

In one or more embodiments, the biometric match and virtual smartcard functionality are hardened using Trusted Execution Environment (TEE) technology, for example a secure enclave, such as Intel® SGX, to protect functionality within the larger device. The various components will be explained in further detail below.

Figure 2:
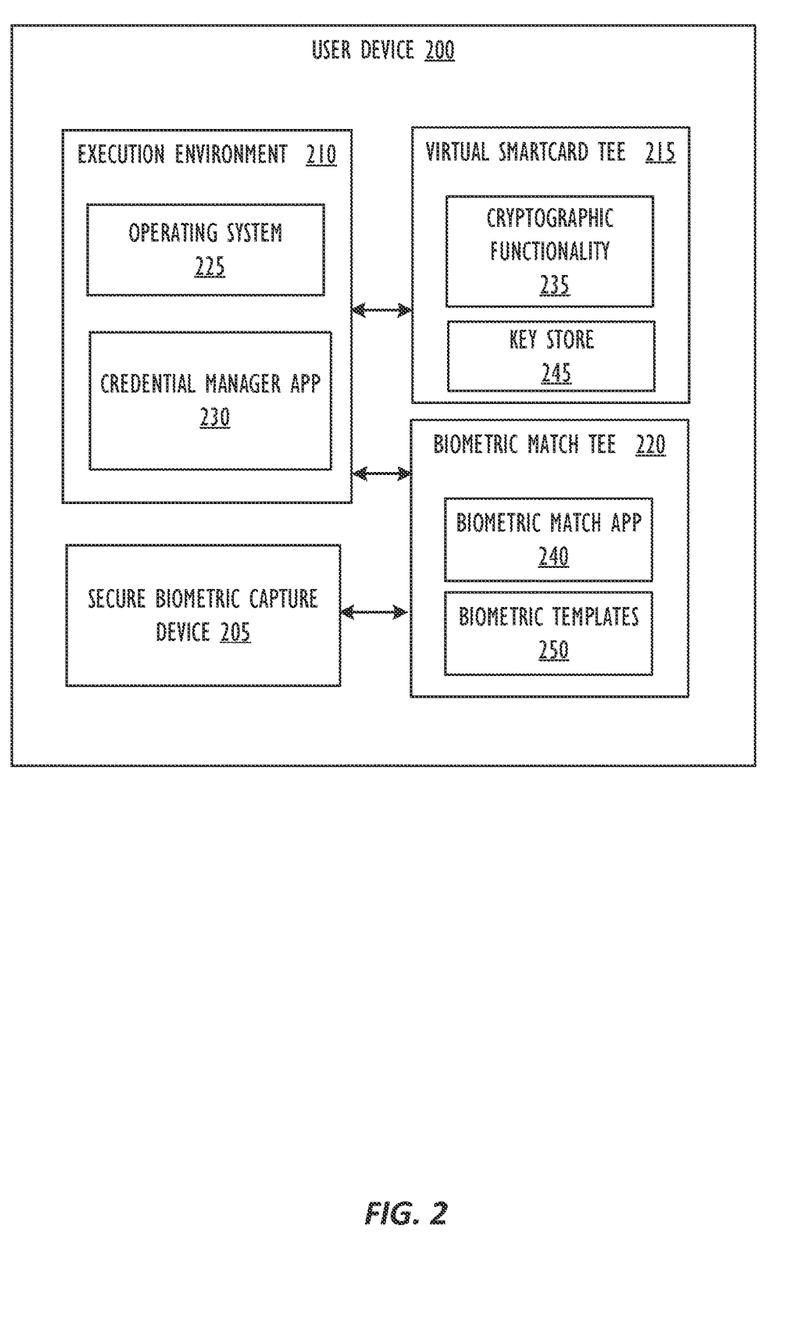
FIG. 2 is a diagram illustrating a user device that supports a technique for secure communication between a virtual smartcard enclave and a trusted I/O enclave, according to one or more embodiments.

FIG. 2 diagram illustrating a user device that supports a technique for secure communication between a virtual smartcard enclave and a trusted I/O enclave, according to one or more embodiments. FIG. 2 includes an execution environment 210, as well as two trusted execution environments (TEEs): virtual smartcard TEE 215 and biometric match TEE 220. Execution environment 210 supports the execution of operating system 225 and other applications, such as a credential manager application 230. For example, applications 230 may require operating system 225 in order to utilize various resources provided by user device 200.

Running alongside execution environment 210 is a virtual smartcard TEE 215 and a biometric match TEE 220. TEEs 215 and 220 are secure execution environments that provide secure services to operating system 225. In one or more embodiments, the TEEs may be secure enclaves. Virtual smartcard TEE 215 and biometric match TEE 220 are completely separate environments, however in one or more embodiments, the virtual smartcard TEE 215 and the biometric match TEE 220 may securely communicate with each other. In one or more embodiments, the TEEs provides a number of functions depicted as various modules. For example, virtual smartcard TEE 215 may include cryptographic functionality 235, as well as a key store 245. Thus, in one or more embodiments, virtual smartcard TEE 215 may be used to hold keys, and encrypt data using the keys. In one or more embodiments, virtual smartcard TEE 215 may be built and destroyed on an as-needed basis. Biometric match TEE 220 may include a biometric match application, along with biometric templates. Thus, biometric match TEE 220 may be operatively connected to secure biometric capture device 205. Biometric match TEE 220 may receive biometric data from the biometric capture device and, utilizing a biometric match application 240, match the biometric data against locally stored biometric templates 250 in the biometric match TEE 220 to identify a match. In one or more embodiments, the biometric match application 240 may use additional factors to determine that the biometric data is authentic, such as signatures provided on the biometric data that indicate that the data was actually captured by the secure biometric capture device 205, and was not inserted by another component.

User device 200 may also include a processor core, such as a micro-processor, an embedded processor, a digital signal processor (DSP), a network processor, or other device to execute code. A processor core may be a single-threaded core or, for at least one embodiment, a processor core may be multithreaded in that they may include more than one hardware thread context (or "logical processor") per core. The processor core may be used to execute the instructions stored in the user device 200, such as the operating system 225, the credential manager application 230, and other instructions stored on the user device 200.

User device 200 may also include a memory of a wide variety of memories (including various layers of memory hierarchy) as are known or otherwise available to those of skill in the art. Program code, or instructions, such as the various applications, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible, non-transitory medium through which the program code may pass, such as antennas, optical fibers, communications interfaces, etc. Program code may be transmitted in the form of packets, serial data, parallel data, etc., and may be used in a compressed or encrypted format. Memory may include one or more code instruction(s) to be executed by the processor cores. For example, in user device 200, the instructions may include the credential manager application 230. A processor core in the user device 200 may follow a program sequence of instructions indicated by the code. In this manner, a processor core may be transformed during execution of the code.

Although not illustrated in FIG. 2, a processing element may include other elements on chip with the processor core. For example, a processing element may include memory control logic along with the processor cores. The processing element may include I/O control logic and/or may include I/O control logic integrated with memory control logic. The processing element may also include one or more caches.

User device 200 may also include a secure biometric capture device 205. Secure biometric capture device 205 may be any kind of secure biometric capture device, such as a fingerprint scanner, camera for facial recognition, retina scanner, or the like. In one or more embodiments, the secure biometric capture device 205 may include additional functionality to authenticate the biometric data. For example, the secure biometric capture device 205 may include an INTEL REALSENSE™ camera, which may contain a camera, along with infrared devices, a microphone array, and the like. (INTEL REALSENSE is a trademark of Intel Corporation.) Through the use of the various components, the INTEL REALSENSE camera may determine that a person in front of the camera is a real person, and not just a projection of an image or a video of the person. In addition, in one or more embodiments, the secure biometric capture device 205 may provide a signature on, for example, each frame of biometric data, to indicate to other modules down the pipeline that the data was actually captured by the secure biometric capture device 205.

Figure 3:
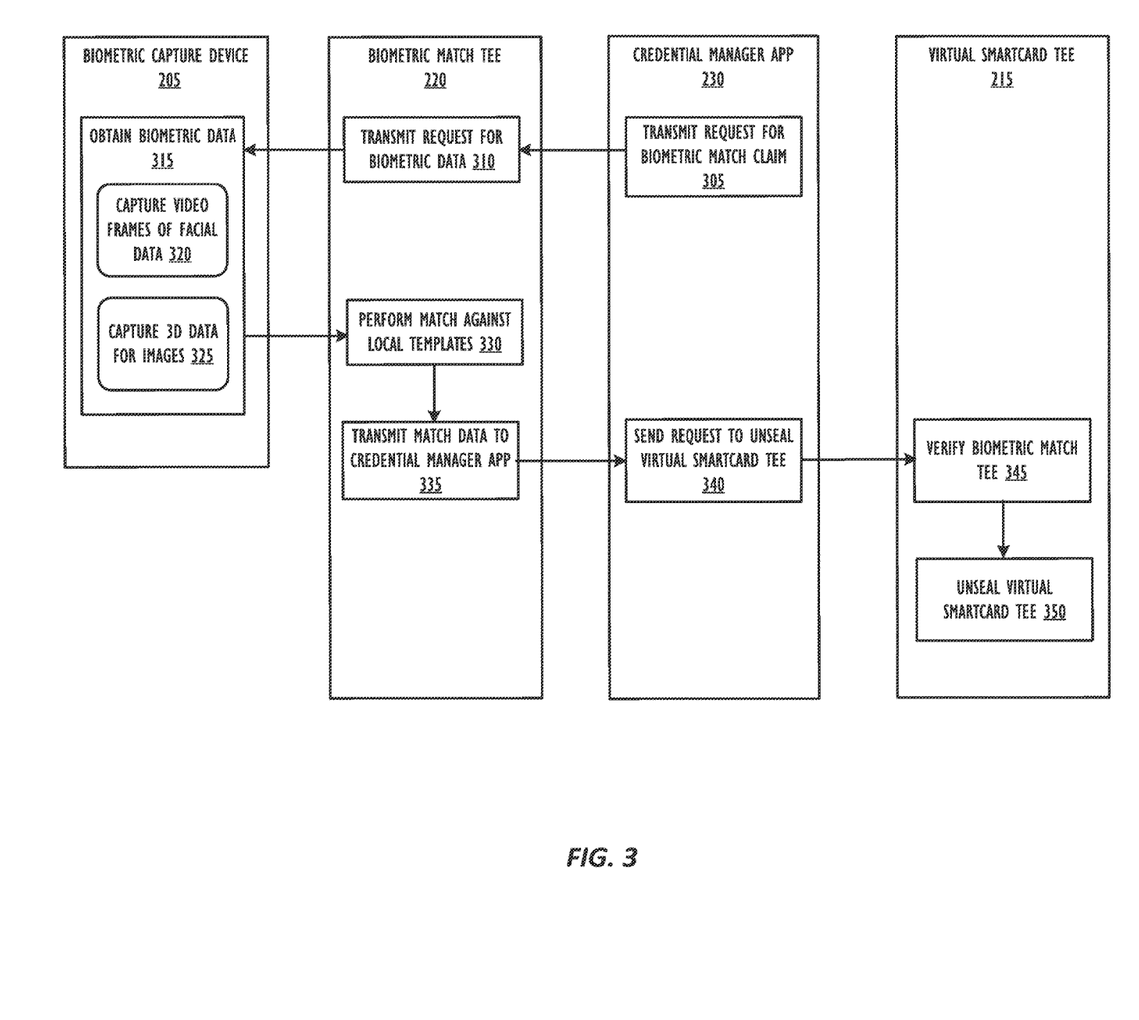
FIG. 3 is a flow diagram illustrating a technique for secure communication across a variety of components in a local device, according to one or more embodiments.

FIG. 3 is a flow diagram illustrating a technique for secure communication across a variety of components in a local device, according to one or more embodiments. FIG. 3 illustrates securely accessing a virtual smartcard, according to one or more embodiments. FIG. 3 includes various components found in a user device. For purposes of clarity, user device 200 is depicted in less detail than in FIG. 2. Although each action is depicted as occurring in a user device 200, the various actions may be performed by different modules within user device 200. Thus biometric capture device 205, biometric match TEE 220, credential manager application 230, and virtual smartcard TEE 215 are all depicted in FIG. 3.

The flow diagram begins at 305, and a request for a biometric match claim is transmitted from a credential manager application 230 to a biometric match TEE 220. In one or more embodiments, a user may need to access the virtual smartcard TEE 215 in order to gain access to cryptographic keys and other cryptographic information for the user. Thus, the credential manager application 230 may identify or create the request for a biometric match claim. At 310, the biometric match TEE 220 transmits a request for biometric data to the biometric capture device 205.

At 315, the biometric capture device obtains biometric data. The biometric capture device 205 may include a camera system, fingerprint scanner, retina scanner, or other device that is capable of capturing and registering biometric data. In one or more embodiments, obtaining biometric data may include at 320, capturing video frames of facial data. Obtaining biometric data may also include at 325, capturing three dimensional data, such as infrared data, for the images. Further, in one or more embodiments, the biometric capture device 205 may verify that the biometric data is coming from a person, and not from an imitation of a person. The biometric capture device 205 may authenticate the data by adding a signature to the data, such as adding a signature to one or more of the video frames captured at 320, or any other kind of data including the biometric data.

At 330, the biometric match TEE 220 receives the biometric data and perform a match against local templates. In one or more embodiments, biometric match TEE 220 includes storage of template data which can be used to identify authorized users. The biometric match TEE may identify a signature in the biometric data indicating that the biometric data was generated by the secure biometric capture device 205 in order to determine a match. In one or more embodiments, the biometric data may include frames of a face, and the biometric match TEE 220 may compare the frames of a face to face templates stored in the biometric match TEE 220. In some embodiments, not all video frames are used in making the biometric match and the biometric match TEE 220 may verify only the signatures of video frames actually used for matching with the biometric template.

At 335, the match data is transmitted to the credential manager application 230. In one or more embodiments, the biometric match TEE 220 may merely alert the credential manager application 230 of the match, and send the match data directly to the virtual smartcard TEE 215. In one or more embodiments, the match data indicates to the credential manager application 230 that the requesting user is authenticated, and the user may be alerted. In one or more embodiments, the credential manager application 230 may send at 340 a request to unseal the virtual smartcard TEE 215 based on the match data.

At 345 the virtual smartcard TEE 215 verifies that the match data has come from an authorized biometric match TEE 220. In one or more embodiments, virtual smartcard TEE 215 and biometric match TEE 220 may be secure enclaves, and a report may be utilized to ensure the virtual smartcard TEE 215 that the biometric match TEE 220 is a valid enclave. In one or more embodiments, the report may be an instruction that can only be called from inside protected memory. The report may include a signed piece of data generated inside the enclave that identifies to the other enclave that the enclave is trusted. The report may be transmitted directly between the virtual smartcard TEE 215 and the biometric match TEE 220, or may be transmitted via the credential manager application 230.

At 350 the virtual smartcard TEE 215 unseals itself. In one or more embodiments, the unsealed virtual smartcard TEE 215 allows the user device 200 to take advantage of the cryptographic functionality and cryptographic keys, which may be specific to the authorized user. In one or more embodiments, when a user logs out of the session, the virtual smartcard TEE 215 may reseal itself. Further, in one or more embodiments, the virtual smartcard TEE 215 may be erased from memory.

Figure 4:
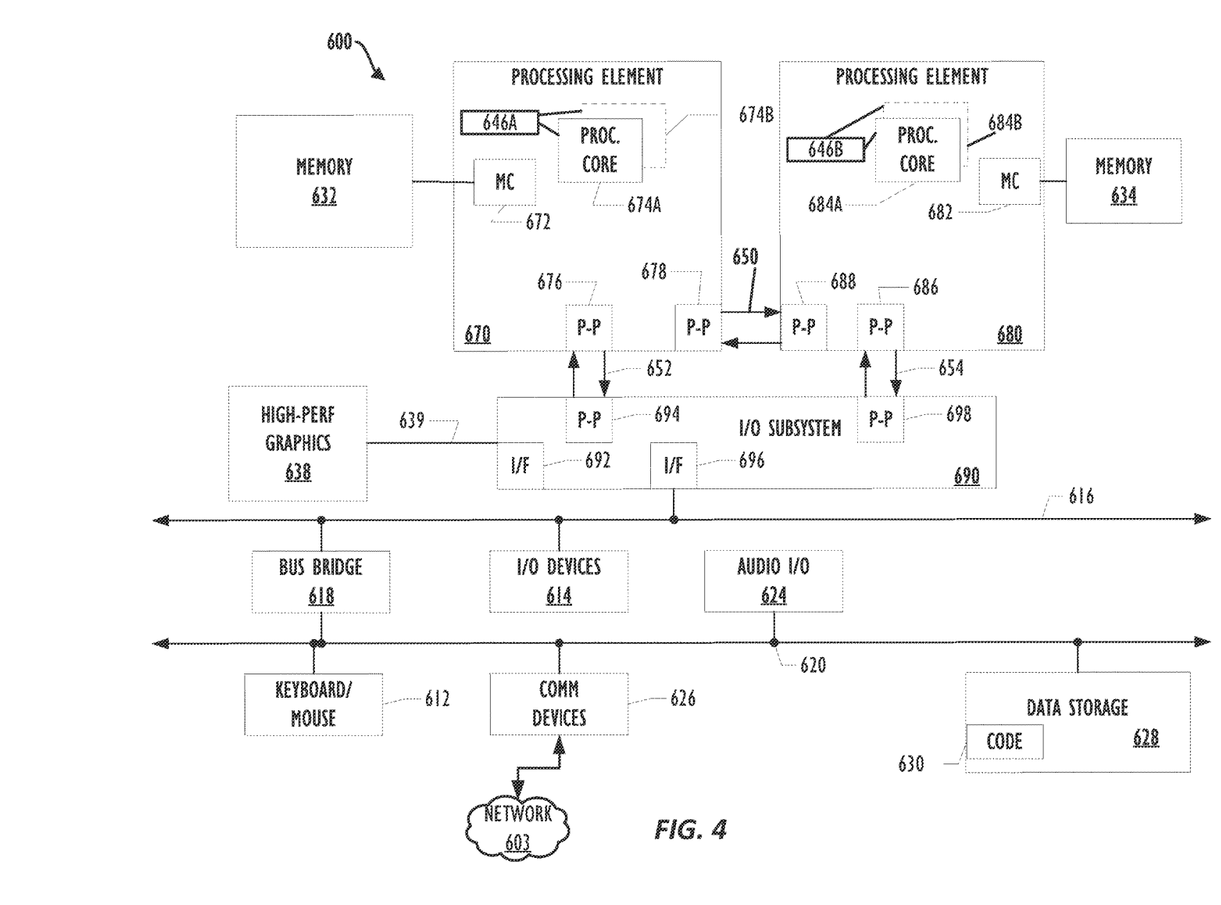
FIG. 4 is a diagram illustrating a computing device for use with techniques described herein according to one embodiment.

Referring now to FIG. 4, a block diagram illustrates a programmable device 600 that may be used within a trusted device, such as local device 200, in accordance with one or more embodiments. The programmable device 600 illustrated in FIG. 4 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 4 may be implemented as a multi-drop bus rather than point-to-point interconnects.

As illustrated in FIG. 4, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-3. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 4 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 4, various I/O devices 614, 624 may be coupled to first link 616, along with a bridge 618 which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 4, a system may implement a multi-drop bus or another such communication topology. Although links 616 and 620 are illustrated as busses in FIG. 6, any desired type of link may be used. Also, the elements of FIG. 4 may alternatively be partitioned using more or fewer integrated chips than illustrated in FIG. 4.

Figure 5:
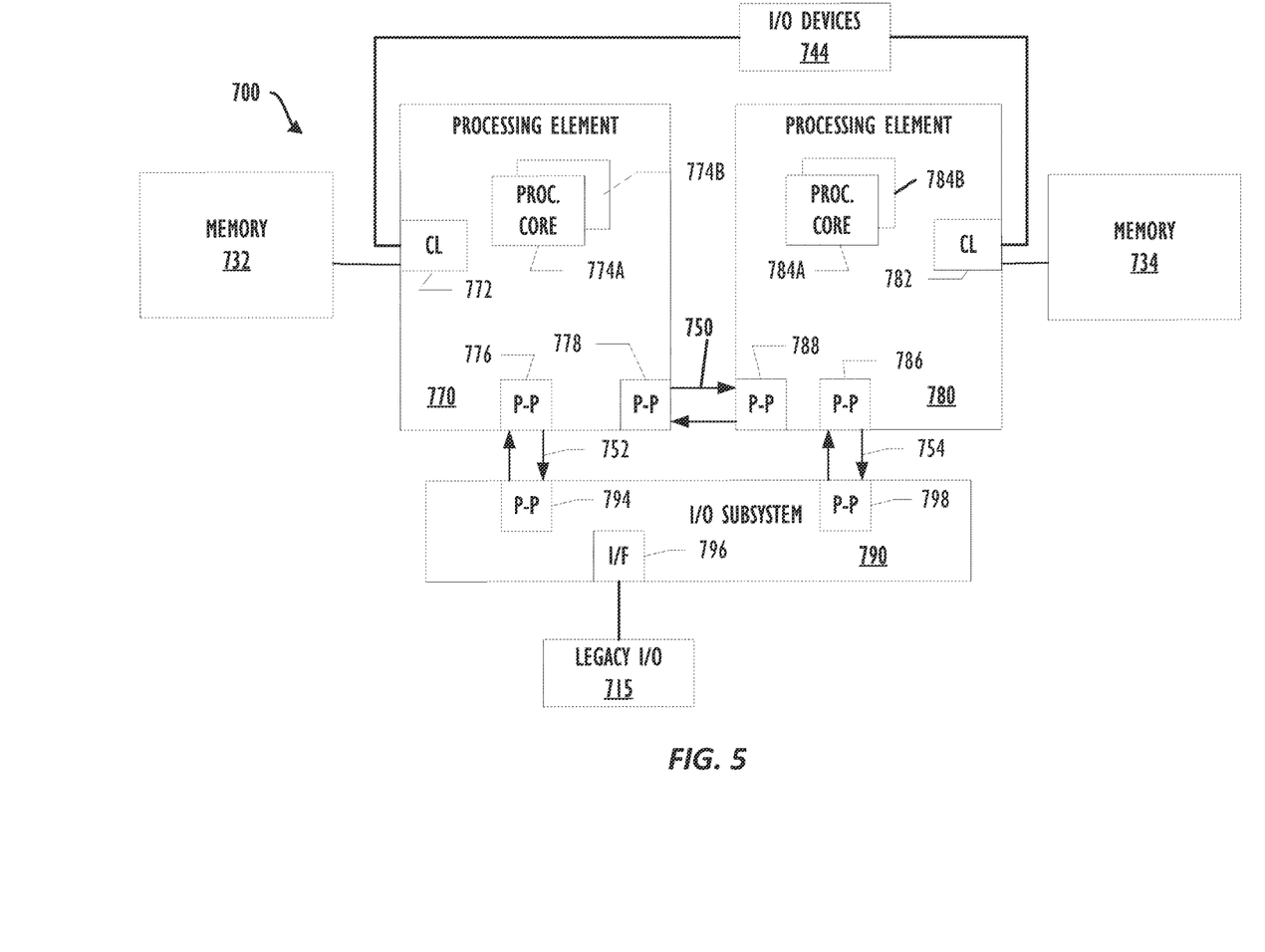
FIG. 5 is a block diagram illustrating a computing device for use with techniques described herein according to another embodiment.

Referring now to FIG. 5, a block diagram illustrates a programmable device 700 according to another embodiment. Certain aspects of FIG. 4 have been omitted from FIG. 5 in order to avoid obscuring other aspects of FIG. 5.

FIG. 5 illustrates that processing elements 770, 780 may include integrated memory and I/O control logic ("CL") 772 and 782, respectively. In some embodiments, the 772, 782 may include memory control logic (MC) such as that described above in connection with FIG. 4. In addition, CL 772, 782 may also include I/O control logic. FIG. 5 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 5 as processor cores 774A, 774B, 784A, and 784B. As illustrated in FIG. 7, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 4 and 5 are schematic illustrations of embodiments of programmable devices which may be utilized to implement various embodiments discussed herein. Various components of the programmable devices depicted in FIGS. 4 and 5 may be combined in a system-on-a-chip (SoC) architecture.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine readable medium on which instructions are stored, comprising instructions that when executed cause a machine to: transmit, from a first trusted execution environment, a request for a biometric match claim; receive, in response to the request for a biometric match claim, biometric data from a biometric capture device; perform a match of the biometric data against biometric templates stored in the first trusted execution environment; and unseal a second trusted execution environment based on the match of the biometric data.

In Example 2 the subject matter of Example 1 optionally includes wherein the instructions that cause a machine to perform a match of the biometric data against biometric templates stored in the first trusted execution environment comprise instructions that when executed further cause the machine to: identify a signature in the biometric data indicating that the biometric data was generated by a secure biometric capture device.

In Example 3 the subject matter of Examples 1-2 optionally includes wherein the first trusted execution environment and the second trusted execution environment are secure enclaves, and wherein the second trusted execution environment verifies the first trusted execution environment based on a report prior to the second trusted execution environment being unsealed.

In Example 4 the subject matter of Examples 1-2 optionally includes wherein the biometric capture device comprises a camera, and wherein the biometric data comprises video frames of a face.

In Example 5 the subject matter of Example 4 optionally includes wherein the first trusted execution environment comprises face templates, and wherein the instructions that cause a machine to perform a match of the biometric data against biometric templates stored in the first trusted execution environment comprise instructions to compare the biometric data received from the biometric capture device with the face templates.

In Example 6 the subject matter of Examples 1-2 optionally includes wherein an intermediary application executing in an untrusted execution environment provides communication between the first trusted execution environment and the second trusted execution environment.

In Example 7 the subject matter of Examples 1-2 optionally includes wherein the second trusted execution environment is a virtual smartcard, and wherein the second trusted execution environment comprises cryptographic data.

Example 8 is a system for secure communications, comprising: one or more processors; and a memory, coupled to the one or more processors, on which are instructions are stored which, when executed by the one or more processors cause at least some of the one or more processors to: transmit, from a first trusted execution environment, a request for a biometric match claim; receive, in response to the request for a biometric match claim, biometric data from a biometric capture device; perform a match of the biometric data against biometric templates stored in the first trusted execution environment; and unseal a second trusted execution environment based on the match of the biometric data.

In Example 9 the subject matter of Example 8 optionally includes wherein the instructions that cause at least some of the one or more processors to perform a match of the biometric data against biometric templates stored in the first trusted execution environment further comprises instructions that when executed further cause at least some of the one or more processors to: identify a signature in the biometric data indicating that the biometric data was generated by a secure biometric capture device.

In Example 10 the subject matter of Examples 8-9 optionally includes wherein the first trusted execution environment and the second trusted execution environment are secure enclaves, and wherein the second trusted execution environment verifies the first trusted execution environment based on a report prior to the second trusted execution environment being unsealed.

In Example 11 the subject matter of Examples 8-9 optionally includes wherein the biometric capture device comprises a camera, and wherein the biometric data comprises video frames of a face.

In Example 12 the subject matter of Example 11 optionally includes wherein the first trusted execution environment comprises face templates, and wherein the instructions that cause at least some of the one or more processors to perform a match of the biometric data against biometric templates stored in the first trusted execution environment further comprise instructions that when executed cause at least some of the one or more processors to compare the biometric data received from the biometric capture device with the face templates.

In Example 13 the subject matter of Examples 8-9 optionally includes wherein an intermediary application executing in an untrusted execution environment provides communication between the first trusted execution environment and the second trusted execution environment.

In Example 14 the subject matter of Examples 8-9 optionally includes wherein the second trusted execution environment is a virtual smartcard, and wherein the second trusted execution environment comprises cryptographic data.

Example 15 is a method for secure communications, comprising: transmitting, from a first trusted execution environment, a request for a biometric match claim; receiving, in response to the request for a biometric match claim, biometric data from a biometric capture device; performing a match of the biometric data against biometric templates stored in the first trusted execution environment; and unsealing a second trusted execution environment based on the match of the biometric data.

In Example 16 the subject matter of Example 15 optionally includes wherein performing a match of the biometric data against biometric templates stored in the first trusted execution environment further comprises: identifying a signature in the biometric data indicating that the biometric data was generated by a secure biometric capture device.

In Example 17 the subject matter of Examples 15-16 optionally includes wherein the first trusted execution environment and the second trusted execution environment are secure enclaves, and wherein the second trusted execution environment verifies the first trusted execution environment based on a report prior to the second trusted execution environment being unsealed.

In Example 18 the subject matter of Examples 15-16 optionally includes wherein the biometric capture device comprises a camera, and wherein the biometric data comprises video frames of a face.

In Example 19 the subject matter of Examples 15-16 optionally includes wherein the first trusted execution environment comprises face templates, and wherein performing a match of the biometric data against biometric templates stored in the first trusted execution environment further comprises comparing the biometric data received from the biometric capture device with a face template.

In Example 20 the subject matter of Examples 15-16 optionally includes wherein an intermediary application executing in an untrusted execution environment provides communication between the first trusted execution environment and the second trusted execution environment.

In Example 21 the subject matter of Examples 15-16 optionally includes wherein the second trusted execution environment is a virtual smartcard, and wherein the second trusted execution environment comprises cryptographic data.

Example 22 is a programmable device, comprising: means for transmitting, from a first trusted execution environment, a request for a biometric match claim; means for receiving, in response to the request for a biometric match claim, biometric data from a biometric capture device; means for performing a match of the biometric data against biometric templates stored in the first trusted execution environment; and means for unsealing a second trusted execution environment based on the match of the biometric data.

In Example 23 the subject matter of Example 22 optionally includes wherein the means for performing a match of the biometric data against biometric templates stored in the first trusted execution environment further comprises: means for identifying a signature in the biometric data indicating that the biometric data was generated by a secure biometric capture device.

In Example 24 the subject matter of Examples 22-23 optionally includes wherein the first trusted execution environment and the second trusted execution environment are secure enclaves, and wherein the second trusted execution environment verifies the first trusted execution environment based on a report prior to the second trusted execution environment being unsealed.

In Example 25 the subject matter of Examples 22-23 optionally includes wherein the biometric capture device comprises a camera, and wherein the biometric data comprises video frames of a face.

In Example 26 the subject matter of Example 25 optionally includes wherein the first trusted execution environment comprises face templates, and wherein the means for performing a match of the biometric data against biometric templates stored in the first trusted execution environment comprises means for comparing the biometric data received from the biometric capture device with the face templates.

In Example 27 the subject matter of Examples 22-23 optionally includes wherein an intermediary application executing in an untrusted execution environment provides communication between the first trusted execution environment and the second trusted execution environment.

In Example 7 the subject matter of Examples 1-2 optionally includes wherein the second trusted execution environment is a virtual smartcard, and wherein the second trusted execution environment comprises cryptographic data.

Example 8 is a system for secure communications, comprising: one or more processors; and a memory, coupled to the one or more processors, on which are instructions are stored which, when executed by the one or more processors cause at least some of the one or more processors to: transmit, from a first trusted execution environment, a request for a biometric match claim; receive, in response to the request for a biometric match claim, biometric data from a biometric capture device; perform a match of the biometric data against biometric templates stored in the first trusted execution environment; and unseal a second trusted execution environment based on the match of the biometric data.

In Example 28 the subject matter of Example 8 optionally includes wherein the instructions that cause at least some of the one or more processors to perform a match of the biometric data against biometric templates stored in the first trusted execution environment further comprises instructions that when executed further cause at least some of the one or more processors to: identify a signature in the biometric data indicating that the biometric data was generated by a secure biometric capture device.

In Example 29 the subject matter of Examples 8-9 optionally includes wherein the first trusted execution environment and the second trusted execution environment are secure enclaves, and wherein the second trusted execution environment verifies the first trusted execution environment based on a report prior to the second trusted execution environment being unsealed.

In Example 30 the subject matter of Examples 8-9 optionally includes wherein the biometric capture device comprises a camera, and wherein the biometric data comprises video frames of a face.

In Example 31 the subject matter of Example 30 optionally includes wherein the first trusted execution environment comprises face templates, and wherein the instructions that cause at least some of the one or more processors to perform a match of the biometric data against biometric templates stored in the first trusted execution environment further comprise instructions that when executed cause at least some of the one or more processors to compare the biometric data received from the biometric capture device with the face templates.

In Example 32 the subject matter of Examples 8-9 optionally includes wherein an intermediary application executing in an untrusted execution environment provides communication between the first trusted execution environment and the second trusted execution environment.

In Example 33 the subject matter of Examples 8-9 optionally includes wherein the second trusted execution environment is a virtual smartcard, and wherein the second trusted execution environment comprises cryptographic data.

Example 34 is a method for secure communications, comprising: transmitting, from a first trusted execution environment, a request for a biometric match claim; receiving, in response to the request for a biometric match claim, biometric data from a biometric capture device; performing a match of the biometric data against biometric templates stored in the first trusted execution environment; and unsealing a second trusted execution environment based on the match of the biometric data.

In Example 35 the subject matter of Example 34 optionally includes wherein performing a match of the biometric data against biometric templates stored in the first trusted execution environment further comprises: identifying a signature in the biometric data indicating that the biometric data was generated by a secure biometric capture device.

In Example 36 the subject matter of Examples 34-35 optionally includes wherein the first trusted execution environment and the second trusted execution environment are secure enclaves, and wherein the second trusted execution environment verifies the first trusted execution environment based on a report prior to the second trusted execution environment being unsealed.

In Example 37 the subject matter of Examples 34-35 optionally includes wherein the biometric capture device comprises a camera, and wherein the biometric data comprises video frames of a face.

In Example 38 the subject matter of Examples 34-35 optionally includes wherein the first trusted execution environment comprises face templates, and wherein performing a match of the biometric data against biometric templates stored in the first trusted execution environment further comprises comparing the biometric data received from the biometric capture device with a face template.

In Example 39 the subject matter of Examples 34-35 optionally includes wherein an intermediary application executing in an untrusted execution environment provides communication between the first trusted execution environment and the second trusted execution environment.

In Example 40 the subject matter of Examples 34-35 optionally includes wherein the second trusted execution environment is a virtual smartcard, and wherein the second trusted execution environment comprises cryptographic data.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore should be determined with reference to the appended claims, along with the full scope of equivalents to which such claims are entitled.

What is claimed is:

1. A hardware machine readable medium comprising instructions that when executed cause a machine to:
   transmit, from a first trusted execution environment operatively connected to a biometric capture device, a request for a biometric match claim;
   receive, in response to the request for the biometric match claim, biometric data from the biometric capture device;
   perform, by the first trusted execution environment, a match of the biometric data against biometric templates stored in the first trusted execution environment;
   verify, with a report including a signed piece of data transmitted by a second trusted execution environment via a credential manager application operating in a third execution environment, an authorization of the first trusted execution environment, wherein the second trusted execution environment is sealed; and in response to the verification of the first trusted execution environment, unseal the second trusted execution environment based on the match of the biometric data performed by the first trusted execution environment, wherein the second trusted execution environment includes a virtual smartcard including cryptographic data specific to a user corresponding to the biometric data, and wherein the first trusted execution environment is independent from the second trusted execution environment.

2. The hardware machine readable medium of claim 1, wherein the instructions, when executed, further cause the machine to:

identify a signature in the biometric data indicating that the biometric data was generated by a secure biometric capture device.

3. The hardware machine readable medium of claim 2, wherein the first trusted execution environment and the second trusted execution environment are secure enclaves.

4. The hardware machine readable medium of claim 1, wherein the biometric capture device includes a camera, and wherein the biometric data includes video frames of a face.

5. The hardware machine readable medium of claim 4, wherein the first trusted execution environment includes face templates, and wherein the instructions, when executed, cause the machine to compare the biometric data received from the biometric capture device with the face templates.

6. The hardware machine readable medium of claim 1, wherein an intermediary application executing in an untrusted execution environment provides communication between the first trusted execution environment and the second trusted execution environment.

7. A system for secure communications, comprising:
one or more processors; and
a memory, coupled to the one or more processors, on which instructions are stored which, when executed by the one or more processors, cause at least some of the one or more processors to:
transmit, from a first trusted execution environment operatively connected to a biometric capture device, a request for a biometric match claim;
receive, in response to the request for the biometric match claim, biometric data from the biometric capture device;
perform, by the first trusted execution environment, a match of the biometric data against biometric templates stored in the first trusted execution environment;
verify, with a report including a signed piece of data transmitted by a second trusted execution environment via a credential manager application operating in a third execution environment, an authorization of the first trusted execution environment, wherein the second trusted execution environment is sealed; and
in response to the verification of the first trusted execution environment, unseal the second trusted execution environment based on the match of the biometric data performed by the first trusted execution environment, wherein the second trusted execution environment includes a virtual smartcard including cryptographic data specific to a user corresponding to the biometric data, and wherein the first trusted execution environment is independent from the second trusted execution environment.

8. The system of claim 7, wherein the instructions that cause at least some of the one or more processors to perform the match of the biometric data against the biometric templates stored in the first trusted execution environment further include instructions that when executed further cause at least some of the one or more processors to:
identify a signature in the biometric data indicating that the biometric data was generated by a secure biometric capture device.

9. The system of claim 8, wherein the first trusted execution environment and the second trusted execution environment are secure enclaves.

10. The system of claim 7, wherein the biometric capture device includes a camera, and wherein the biometric data includes video frames of a face.

11. The system of claim 10, wherein the first trusted execution environment includes face templates, and
wherein the instructions that cause at least some of the one or more processors to perform the match of the biometric data against the biometric templates stored in the first trusted execution environment further include instructions that when executed cause at least some of the one or more processors to compare the biometric data received from the biometric capture device with the face templates.

12. The system of claim 7, wherein an intermediary application executing in an untrusted execution environment provides communication between the first trusted execution environment and the second trusted execution environment.

13. A method for secure communications, comprising:
transmitting, from a first trusted execution environment operatively connected to a biometric capture device, a request for a biometric match claim;
receiving, in response to the request for the biometric match claim, biometric data from the biometric capture device;
performing, by the first trusted execution environment, a match of the biometric data against biometric templates stored in the first trusted execution environment; and
verifying, with a report including a signed piece of data transmitted by a second trusted execution environment via a credential manager application operating in a third execution environment, an authorization of the first trusted execution environment, wherein the second trusted execution environment is sealed; and
in response to the verification of the first trusted execution environment, unsealing the second trusted execution environment based on the match of the biometric data performed by the first trusted execution environment, wherein the second trusted execution environment includes a virtual smartcard including cryptographic data specific to a user corresponding to the biometric data, and wherein the first trusted execution environment is independent from the second trusted execution environment.

14. The method of claim 13, wherein the performing of the match of the biometric data against the biometric templates stored in the first trusted execution environment further includes:
identifying a signature in the biometric data indicating that the biometric data was generated by a secure biometric capture device.

15. The method of claim 14, wherein the first trusted execution environment and the second trusted execution environment are secure enclaves.

16. The method of claim 13, wherein the biometric capture device includes a camera, and wherein the biometric data includes video frames of a face.

17. The method of claim 13, wherein the first trusted execution environment includes face templates, and
   wherein the performing of the match of the biometric data against the biometric templates stored in the first trusted execution environment further includes comparing the biometric data received from the biometric capture device with the face templates.

18. The method of claim 13, wherein an intermediary application executing in an untrusted execution environment provides communication between the first trusted execution environment and the second trusted execution environment.

* * * * *